United States Patent [19]
Bronkhorst

[11] 3,824,918
[45] July 23, 1974

[54] PROCESSING A CURD-WHEY MIXTURE

[75] Inventor: Armand Francois Bronkhorst, Doorn, Netherlands

[73] Assignee: Holvrieka International B.V., Utrecht, Netherlands

[22] Filed: Dec. 20, 1972

[21] Appl. No.: 317,089

[30] Foreign Application Priority Data
Dec. 21, 1971 Netherlands.................... 7117579

[52] U.S. Cl. .............................................. 99/452
[51] Int. Cl. ........................................... A23c 19/02
[58] Field of Search ............ 99/454, 460, 461, 456, 99/458, 457

[56] References Cited
UNITED STATES PATENTS

| | | | |
|---|---|---|---|
| 3,047,951 | 8/1961 | Boeuf.................................. | 99/452 |
| 3,192,626 | 7/1965 | Boeuf.................................. | 99/460 |
| 3,403,444 | 10/1968 | Chollet................................ | 99/458 |
| 3,482,507 | 12/1969 | Richardson........................... | 99/452 |

*Primary Examiner*—Robert W. Jenkins
*Attorney, Agent, or Firm*—Cushman, Darby & Cushman

[57] ABSTRACT

A method of processing a curd-whey mixture in a cycle process into cheese, as well as an apparatus for applying this method. In this apparatus single or assemblies of vertical tubes are applied for the different processing phases. In the first tube the curd coming from a prior art apparatus for separating curd mass from whey is lowered in cheese moulds, as a result of which the cheese is pressed by the stacking in the tube. Via a conveyor with emptying mechanism the cheeses are lowered in containers and the empty moulds are again passed to the whey-curd separator. The containers, having a sieve for discharging excess whey, on which the cheeses come to rest are lifted in a second tube at a speed sufficient to reduce the bacterial activity. Then the cheeses move to a curing and brining section comprising a plurality of vertical tubes in order to be brined. The cheeses remain in said section for so long a time as is necessary for sufficient curing. After removal of the ready cheeses the containers are introduced in another vertical tube functioning as a container storage tube. Containers withdrawn from the lower end come again in the place where the cheeses are lowered from the moulds into the containers.

7 Claims, 5 Drawing Figures

PROCESSING A CURD-WHEY MIXTURE

The invention relates to a method of processing the curd-whey mixture coming from the cheese box into cheese, wherein the curd is drained and put into cheese moulds, this cheese is pressed, subsequently subjected to the cycle process, afterwards brined and finally stored for curing. The invention also concerns an apparatus for applying this method. The above method is well-known. Some treatments therein, like the addition of rennet to the milk present in the cheese box take place at the ambient temperature and other treatments, like brining, at about 4°–13°C. Furthermore it is known that in the cheese once formed the temperature increases to 30°–35°C as a result of bacteriological processes therein, which temperature is the natural temperature of the cheese. Consequently the various treatments require much time.

The object of the invention is to reduce this period of time without reducing the quality of the cheese obtained. To this end the method is carried out in such a manner that all these treatments are carried out at a temperature corresponding with the natural temperature of the cheese by controlling the heat dissipation such as restriction of the convection and/or controlling the evaporation and with a relative moisture content of the ambient air of a nearly maximum value substantially stopping the evaporation from the cheese.

By carrying out the method at said higher temperature and the desired high relative moisture content of the air being in contact with the cheese an acceleration of the bacteriological processes is achieved.

Moreover the method can be carried out in such a manner that all phases of the process take place by advancing the moulds filled with cheeses in vertical or substantially vertical tubes. Thus a drastic automation becomes possible. Besides the method according to the invention can be carried out such that pressing of the cheeses is effected by stacking moulds filled with cheeses and closed by followers, which move vertically downwardly, wherein the stack is at the top each time supplemented with a mould after the lowermost mould has returned from the stack.

By this, pressing of the cheese is considerably simplified and also automated, which renders automation of the following treatments possible.

The apparatus according to the invention which is provided with a whey-curd separator as described in applicants' Dutch application No. 70,03851, which has meanwhile been laid open to public inspection, is so constructed that behind the whey-curd separator a first vertical hollow tube is placed having an inner width adapted to the mould-follower assemblies, which hollow tube is provided at its open upper end with an introducing mechanism for said assemblies and at its lower end with a device receiving the followers and passing them back to its upper end, as well as a first conveyor receiving the moulds, behind which first tube at least a second vertical hollow tube is arranged in which from a second conveyor, which has taken over the cheeses from the first conveyor, the cheeses are shifted for being cycled one by one in upward direction, which second tube is followed by a third vertical tube which receives the cheeses from the second tube and in which the cycle process is continued and the cheeses are again lowered on the second conveyor and are shifted upwardly into at least a fourth vertical tube, which after receiving of the cheeses from the third tube can be closed and be filled with brine and can serve as a storage place for curing after brining.

By applying hollow tubes whose inner dimension is adapted to the dimensions of the cheese moulds or box it is achieved that in these tubes the desired air properties can be maintained. Moreover a considerable restriction of the floor surface on which the apparatus is diposed and an effective use of the space over it is achieved.

The invention will now be elucidated in more detail with reference to the drawing showing a non-limitative embodiment by way of example.

In the drawing, which is for the greater part schematical:

Figure 3:
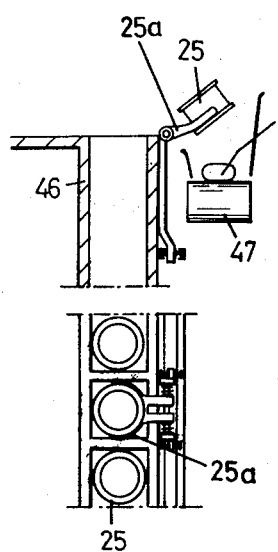
Figure 4:
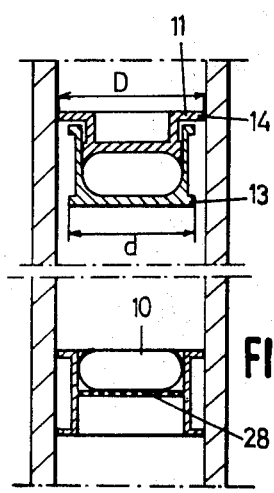
Figure 5:
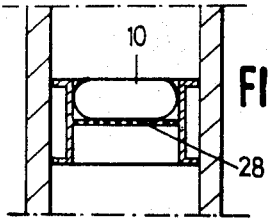

FIG. 3 also shows in section the upper end of a brine tube or curing tube, as well as a plan view thereof;

FIG. 4 is a section through a cheese mould with a cheese present therein and a superposed follower, and FIG. 5 is a section through a mould.

Figure 1:
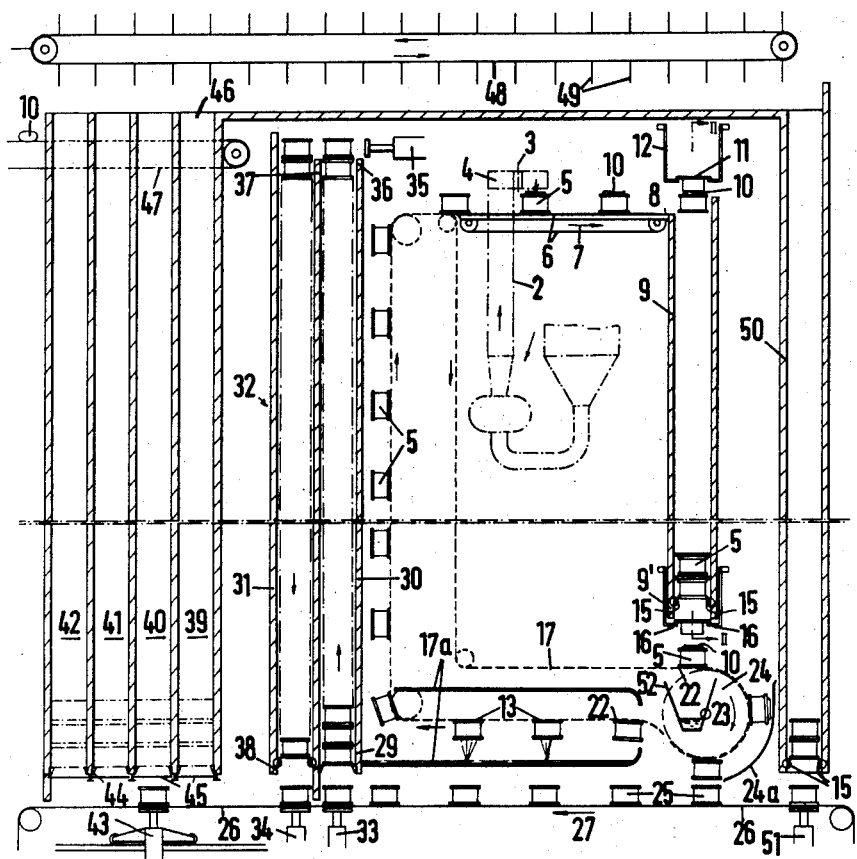
FIG. 1 is a view of the apparatus in which the tubes and some other parts are drawn in longitudinal section.
Figure 2:
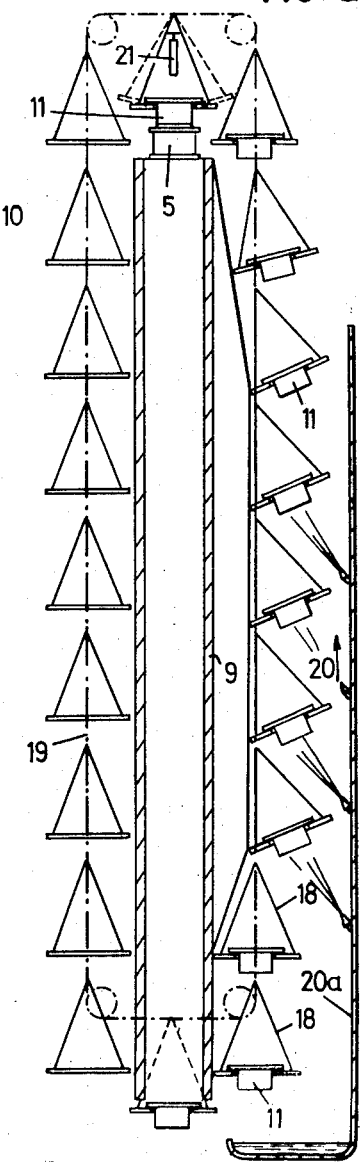
FIG. 2 is a longitudinal section at 90° of the cheese press tube shown along the line II—II in FIG. 1.

FIG. 1 shows by interrupted lines and also schematically the whey-cured separator 1 as described in Dutch application No. 70,03851. As is known, above the lifting tube 2 for the curd-whey mixture there are disposed curd containers 4 rotating about a shaft 3 from which the curd mass for the greater part drained from whey is transferred into the cheese moulds 5 moving past the lifting tube. These cheese moulds are displaced by an endless belt conveyor 6 in the direction of the arrow 7 to the upper end 8 of the cheese press tube 9. This belt conveyor is known from the above prior patent application. In this application a follower 11 is placed on the cheese 10 by means of a device 12 described further. In what after arrival of each time one cheese mould also a follower is present will now be explained, to which end reference is made particularly to FIGS. 2 and 4. (Incidentally it is observed that 10 indicates both the not yet pressed curd mass and the cheeses already pressed).

The cheese mould 5 with normally formed inner space has at the bottom an outwardly extending flange 13 of a diameter $d$. The follower 11 which for the greater part also has a normal shape has on its top also an outwardly extending flange 14 with a diameter D, which is somewhat larger than the diameter $d$. The diameter of the cheese press tube and the remaining tubes of the apparatus is so much larger than D that the assembly mould-follower can move in the tubes without friction.

Via the upper end 8 of the press tube 9 filled mould-follower assemblies are successively lowered, whereby each time a next mould comes to rest on a preceding follower. To avoid undesired shifting of the stack present in the tube 9, inwardly extending first abutment means 15 are disposed adjacent the lower end 14 of the tube, which means work intermittently and stop the lowermost cheese mould in the operative position.

If these abutment means are in the inoperative or withdrawn position they recede so much outwardly that not only the cheese mould but also the follower can pass. At the end of the tube 9 there are second intermittently operating abutment means 16 which in their operative position let the cheese mould with contents pass but stop the follower at its flange 14.

The cheese mould is now lowered on a first conveyor with endless conveyor chain 17 at such a level that there is sufficient space between the lower end 9' of the press tube and the upper side of the cheese mould 5 to shift a follower 11 leaving the tube laterally away after the abutment means 15 have come into the operative position. This follower then comes to rest in a yoke 18 of an elevator 19, which elevator runs beside and outside the tube 9. With followers resting in the yokes one part of the elevator moves in the direction of the arrow 20 upwardly via a washing device 20a for the followers to the upper end 8 of the tube, where means 21 are present which spread the yoke legs to release the follower and lower it on a filled mould meanswhile arrived.

Now the operation of the first conveyor 17 will be described more in detail. On this conveyor, which serves to return the empty moulds via a rinsing device 17a to the curd filling device, engaging means 22 are present which hold the cheese moulds at their bottom flange 13. This is necessary because after collection of the cheese moulds at the lower end 9' of the press tube 9 the conveyor chain runs about a reverse gear 24 in the direction of the arrow 23, as a result of which the cheese moulds are toppled over and the cheese meanwhile formed by pressing the curd mass falls out of the mould.

The cheeses are collected one by one via a guide plate 24a, which guard the cheeses from prematurely falling out of the moulds, in containers 25 which are also displaced in the direction indicated by the arrow 27 by means of a second conveyor 26.

The containers 25 are open cylinders of a height which substantially corresponds with the double cheese thickness. At half the height, so adjacent the center, a transverse finemesh gauze 28 is stretched. After it has received the cheese falling from the mould, the cheese comes to rest on this gauze.

The containers are taken by means of the conveyor 26 to, in the present embodiment, the lower end 29 of a cycling device 32 consisting of two tube sections 30, 31 arranged in side-by-side relationship. At these lower ends means 33, 34 are disposed of which the first is meant to press the containers one by one upwardly into the tube section 30. The containers rest therein in stackwise relationship on each other. If the tube section 30 is filled, a shift mechanism 35 ensures that when further containers are introduced a container rising above the upper end 36 of the first tube section 30 comes above the upper end 37 of the second tube section 31 and is placed on the preceding container already present therein. The tube section 31 also contains a stack of containers which are lowered therein at the lower end 38 by means of the device 34 to rest again on the conveyor 26.

The cycle of the containers with the cheeses through the tube sections 30, 31 takes place at such a speed that the containers are present therein for such a time as is necessary to render the bacteria in the cheese an opportunity of breaking off the lactose.

The conveyor 26 takes the cheeses in the containers having completed the cycle process to the brine tubes, in the present embodiment four a number and indicated by 39, 40, 41 and 42.

The tubes 39-42 are successively filled by a movable push up means 43. If the filling operation is completed the lower ends 44 of the tubes are closed by covers 45 and now brine can be admitted in the tubes.

Brining can take place by filling the tubes completely or by permitting brine from the top and causing it to drip cascade-like from the uppermost cheeses to the lovermost cheeses.

In the first instance the cheeses will float and then free themselves from the subjacent gauze and are subsequently stopped by the superimposed gauze of the higher container.

In the second instance the gauzes pass the dripping brine.

During said brining the curing process starts. This continues for a considerable time after the brining time has expired and the brine is discharged. As the capacity of the brining device shown is four times higher than that of the cheese press — the total processing time is determined by the conveyors 17 and 26 moving at equal speed — the cheeses can remain for a considerable time in the brine tubes. Curing can continue after removal of the cheeses via the upper end 46 of the tubes and during the time that they are taken to the storage space (not shown).

FIG. 3 shows how after leaving the tubes 39-42 the cheeses 10 from the containers 25 come on a conveyor belt 47 by toppling over with a movable toppling device 25a.

The empty containers are subsequently passed by and endless conveyor chain 48 with transverse bars 49 to a storage tube 50 and are stacked therein. At the lower end of the tube 50 there were, just as in the press tube, means 15 to release the containers one by one and to lower them on the second conveyor 26 by means of a suitable device 51.

Under the press tube there is disposed a collecting device 52 to collect the remainder of whey during pressing.

It will be clear that many modifications are possible without departing from the framework of the invention.

I claim:

1. An apparatus for processing curd-whey into cheese comprising a whey-curd separator, a plurality of cheese moulds, a plurality of cheese mould-followers, a first vertical hollow tube having an inner width adapted to receive the mould-followers, which tube at its open upper end is provided with an introducing mechanism for said mould-followers and at its lower end with a device taking up the followers and returning them to its upper end, as well as a first conveyor which receives the moulds, a second conveyor for receiving cheeses from the moulds on the first conveyor, at least a second vertical hollow tube, means for shifting the cheeses into said second tube and for cycling the cheeses one by one in an upward direction, a third vertical tube which receives the cheeses from the second tube and in which the cycle process is continued, means for lowering the cheeses again on to the second conveyor, means for shifting the cheeses into at least a fourth vertical tube, which after receiving the cheeses from the third tube can be closed and filled with brine and after brining can serve as a storage space for curing.

2. An apparatus according to claim 1, characterized in that the length of the first tube is dependent on the number of cheese moulds with followers to be introduced therein and the residence time, so that pressing can be effected by either the own weight of the stacked filled mould-follower assemblies, or by a weighting own of said assemblies.

3. An apparatus according to claim 1, characterized in that adjacent the lower end of the first tube two vertically spaced intermittent, inwardly extending abutment means are provided of which the first means each time lower the lowermost mould follower on the first conveyor and the second abutment means lift the followers from the filled mould and release same one by one to said first conveyor.

4. An apparatus according to claim 1, characterized in that the first conveyor is an endless chain conveyor with means for holding the moulds, which conveyor is provided with a reverse gear with a cyclindrical guide plate for stopping the cheeses to lower the cheeses from the moulds, said apparatus including containers on the second conveyor for receiving the cheeses when these containers pass the lower end of the guide plate, said first conveyor being adapted to return the empty moulds to the whey-curd separator.

5. An apparatus as in claim 4, characterized in that the second tube comprises two juxtaposed sections and is provided with means to lift the cheeses in said containers, for passing the cycle process, in the first section successively upwardly to the upper end thereof, to the upper end of the second section and subsequently lowering same therein and placing the filled containers again on the second conveyor.

6. An apparatus according to claim 4, characterized in that the third tube comprises a number of juxtaposed sections which at their lower ends are provided with means to receive the containers from the second conveyor and displace them upwardly, and means for closing the lower ends of the third tube sections and for admitting brine and after expiry of the brine time discharging said brine, and means at the upper end of the third tube sections to take the cheeses from the containers and to discharge the containers.

7. An apparatus according to claim 4, characterized in that the third tube comprises a number of juxtaposed sections, which at their lower ends are provided with means to receive the containers from the second conveyor and displace same upwardly, and means for dripping the cheeses with brine and after expiry of the brine time for discharging the brine and means at the upper ends of the third tube sections to remove the cheese from the containers, and to discharge the containers.

* * * * *